United States Patent Office 3,366,655
Patented Jan. 30, 1968

---

3,366,655
PROCESS FOR THE PREPARATION OF MIXED HALO-ALKYLANTIMONY COMPOUNDS
Harold I. Weingarten, St. Louis, and William A. White, Creve Coeur, Mo., assignors to Monsanto Company, St. Louis, Mo., a corporation of Delaware
No Drawing. Filed June 1, 1965, Ser. No. 460,570
6 Claims. (Cl. 260—446)

The present invention relates to the preparation of mixed halo-alkyl compounds of antimony, i.e. compounds of antimony which contain both halo and alkyl moieties in the same compound. It is an object of the invention to prepare specific mixed compounds in high yield. The compounds contemplated in the present invention have the formula $SbA_xQ_y$. In this formula A is an alkyl radical having from 1 to 10 carbon atoms, Q is a halogen selected from the group consisting of fluorine, chlorine, bromine and iodine. The subscript designations, $x$ and $y$, are whole numbers from 1 to 2, with $x$ plus $y$ being equal to 3.

It has been found that the production of mixed haloalkyl antimony compounds becomes possible when the preparation of these compounds is carried out in the presence of a specific alkylacylamide solvent selected from the group consisting of dialkylacylamides in which the alkyl and acyl radicals have from 1 to 5 carbon atoms.

When the reaction is carried out in other solvents or without solvent a wholly different reaction takes place: the trialkyl antimony and the trihalo antimony react to form a molecular addition compound which subsequently decomposes to give metallic antimony. In dialkylacylamide solvents, however, such as dimethylformamide, dimethylacetamide or dibutylpropionamide this destructive side reaction is substantially suppressed.

The starting materials in the present process are the trialkylantimony compounds having from 1 to 10 carbon atoms in each of the alkyl radicals, and the trihaloantimony compounds. In order to obtain the respective mixed compounds in which $x$ is 1 or 2 in the above formula, approximately stoichiometric proportions of the aforesaid starting materials are mixed in the presence of the specific alkylacylamide. The proportion of the reactants and the solvent is generally in the range of from 1% to 40% by weight of the antimony reactants relative to the weight of the solvent, a preferred range being from 5% to 35% by weight. The reaction is readily carried out by mixing the antimony trialkyl, such as trimethyl, triethyl, tripropyl or tributyl compound with the antimony trihalo compound, such as the trifluoro, trichloro, tribromo or triiodo compound with the solvent being added at any point and, heating together the solvent and the two reactants described above. It is preferred that the antimony alkyl compound be added to the antimony halide.

The temperature at which the present reaction is conducted is usually in the range of 35°C. to 150° C., or preferably 50 to 100° C., with the higher temperatures providing a faster reaction time. The pressure is not a critical variable and may be maintained at atmospheric, superatmospheric or vacuum conditions. Separation of the individual mixed compounds resulting from the present process is readily carried out by conventional means such as distillation. It is preferred to employ vacuum distillation for example by the use of a vacuum of from 1 to $10^{-3}$ mm. to 10 mm. Hg pressure.

The following examples illustrate specific embodiments of the present invention.

EXAMPLE 1

Antimony trichloride, 2.28 g., is weighed into a pressure tube, after which 10 g. dimethylformamide is added as solvent. When the $SbCl_3$ dissolves, 3.33 g. of antimony trimethyl is added to the solution and the tube is sealed. It is found that heating of the product to about 100° C. for one day gives an 88.3% yield of the compound $Sb(CH_3)_2Cl$.

The identification of the product is conducted by nuclear-magnetic resonance with tau being 9.16 for $Sb(CH_3)_3$; 8.634 for $Sb(CH_3)_2Cl$; and 8.27 for $Sb(CH_3)Cl_2$, expressed as parts per million.

The separation of the products is readily carried out by distillation to obtain a yield of 88.3% by weight of dimethylmonochlorantimony with 6.5% monomethyldichlorantimony and a minor proportion of unreacted starting materials.

When the experiment is carried out with 9.12 g. of the antimony trichloride, and 20 g. of the solvent, the major product is monomethyldichlorantimony and the minor product dimethylmonochlorantimony.

EXAMPLE 2

Repetition of the procedure of the first part of Example 1 in four experiments, using similar proportions, but studying the following variables as a solvent; (1) no solvent, (2) carbon tetrachloride, (3) toluene and (4) benzonitrile, shows that in all the experiments the reaction takes a different course from that of Example 1. A light yellow precipitate of a complex is formed which gradually blackens to deposit an antimony mirror.

EXAMPLE 3

Antimony tribromide, 0.181 g., is weighed into a pressure tube, after which 1 g. of diethylacetamide is added as the solvent. When the $SbBr_3$ dissolves, antimony triethyl 0.209 g., is added. The tube is sealed and kept at 100° C. for 10 hrs. Analysis by proton n.m.r. reveals the product $Sb(C_2H_5)_2Br$ formed in 88% yield with $Sb(C_2H_5)Br_2$ as the minor product.

When 0.725 g. of antimony tribromide is used, the major product is $Sb(C_2H_5)Br_2$ with the minor product being $Sb(C_2H_5)_2Br$. The products are readily distilled from the reaction mixture at reduced pressure.

What is claimed is:

1. Process for the preparation of mixed alkylhaloantimony compounds which comprises heating together an antimony trialkyl compound having from 1 to 10 carbon atoms in the alkyl radical, and an antimony trihalo compound in which the halogen is selected from the group consisting of fluorine, chlorine, bromine, and iodine, the said reaction being carried out in the presence of a dialkylacylamide solvent in which the alkyl radicals and the acyl radicals have from 1 to 5 carbon atoms.

2. Process for the preparation of mixed alkylhaloantimony compounds which comprises heating together to a temperature of from 35° C. to 150° C. substantially stoichiometric proportions of an antimony trialkyl compound having from 1 to 10 carbon atoms in the alkyl radical, and an antimony trihalo compound in which the halogen is selected from the group consisting of fluorine, chlorine, bromine, and iodine, with the said reaction being carried out in the presence of a dialkylacylamide solvent in which the alkyl radicals and the acyl radicals have from 1 to 5 carbon atoms, and thereafter separating the said product from the reaction mixture, the said solvent being present in such proportions that the said antimony reactants are present in the range of from 1% to 40% by weight relative to the weight of the said solvent.

3. Process for the preparation of antimony dimethylmonochloride which comprises heating together at a temperature of from 35° C. to 150° C. approximately 2 molar proportions of antimony trimethyl and approximately 1 molar proportion of antimony trichloride, the said antimony trimethyl being added to the said antimony trichloride, the said reaction being carried out in the presence of dimethylformamide as a solvent, with the said reactants being present in the solvent in the proportion of from 1% to 40% by weight relative to the weight of the said solvent, and thereafter separating the product from the reaction mixture.

4. Process for the preparation of antimony monomethyldichloride which comprises heating together at a temperature of from 35° C. to 150° C. approximately 1 molar proportion of antimony trimethyl and approximately 2 molar proportions of antimony trichloride, the said antimony trimethyl being added to the said antimony trichloride, the said reaction being carried out in the presence of dimethylformamide as a solvent, with the said reactants being present in the solvent in the proportion of from 1% to 40% by weight relative to the weight of the said solvent, and thereafter separating the product from the reaction mixture.

5. Process for the preparation of antimony diethylmonobromide which comprises heating together at a temperature of from 35° C. to 150° C. approximately 2 molar proportions of antimony triethyl and approximately 1 molar proportion of antimony tribromide, the said antimony triethyl being added to the said antimony tribromide, the said reaction being carried out in the presence of diethylacetamide as a solvent, with the said reactants being present in the solvent in the proportion of from 1% to 40% by weight relative to the weight of the said solvent, and thereafter separating the product from the reaction mixture.

6. Process for the preparation of antimony monoethyldibromide which comprises heating together at a temperature of from 35° C. to 150° C. approximately 1 molar proportion of antimony triethyl and approximately 2 molar proportions of antimony tribromide, the said antimony triethyl being added to the said antimony tribromide, the said reaction being carried out in the presence of diethylacetamide as a solvent, with the said reactants being present in the solvent in the proportion of from 1% to 40% by weight relative to the weight of the said solvent, and thereafter separating the product from the reaction mixture.

References Cited

Dub, Organometallic Compounds, volume III (1962), page 554.

Maier et al., J.A.C.S., volume 79 (1957), pages 5884 to 5888.

TOBIAS E. LEVOW, *Primary Examiner.*

W. F. W. BELLAMY, *Assistant Examiner.*